April 26, 1949.
T. ROBINSON
2,468,515
APPARATUS FOR SONIC PULVERIZATION
AND DISPERSION OF MATERIALS
Filed Nov. 29, 1944
5 Sheets-Sheet 1
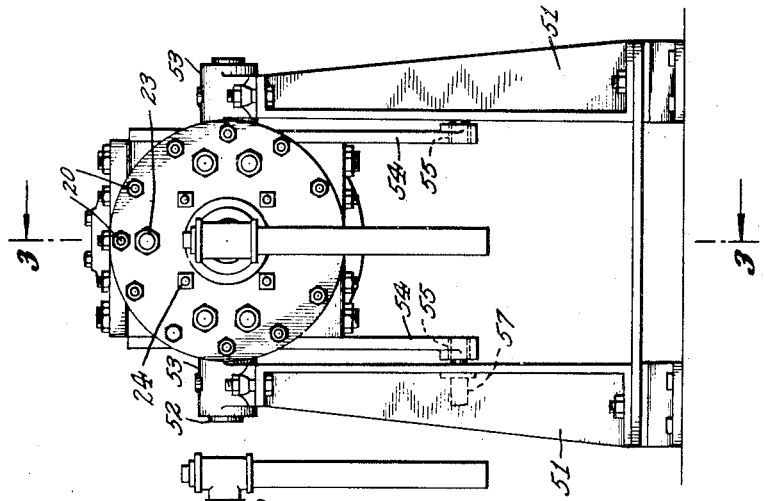
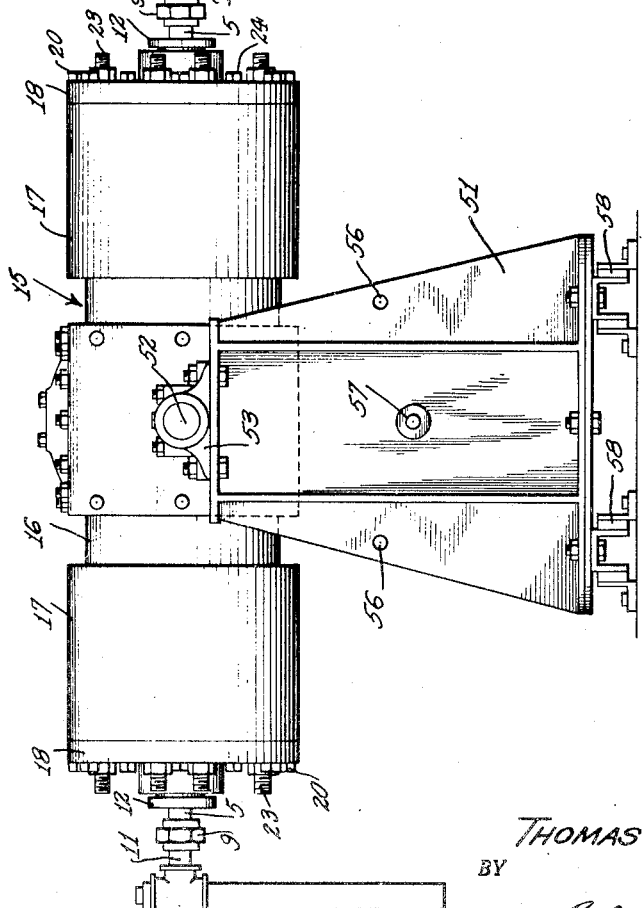
INVENTOR.
THOMAS ROBINSON
BY
Robert E Burns
ATTORNEY

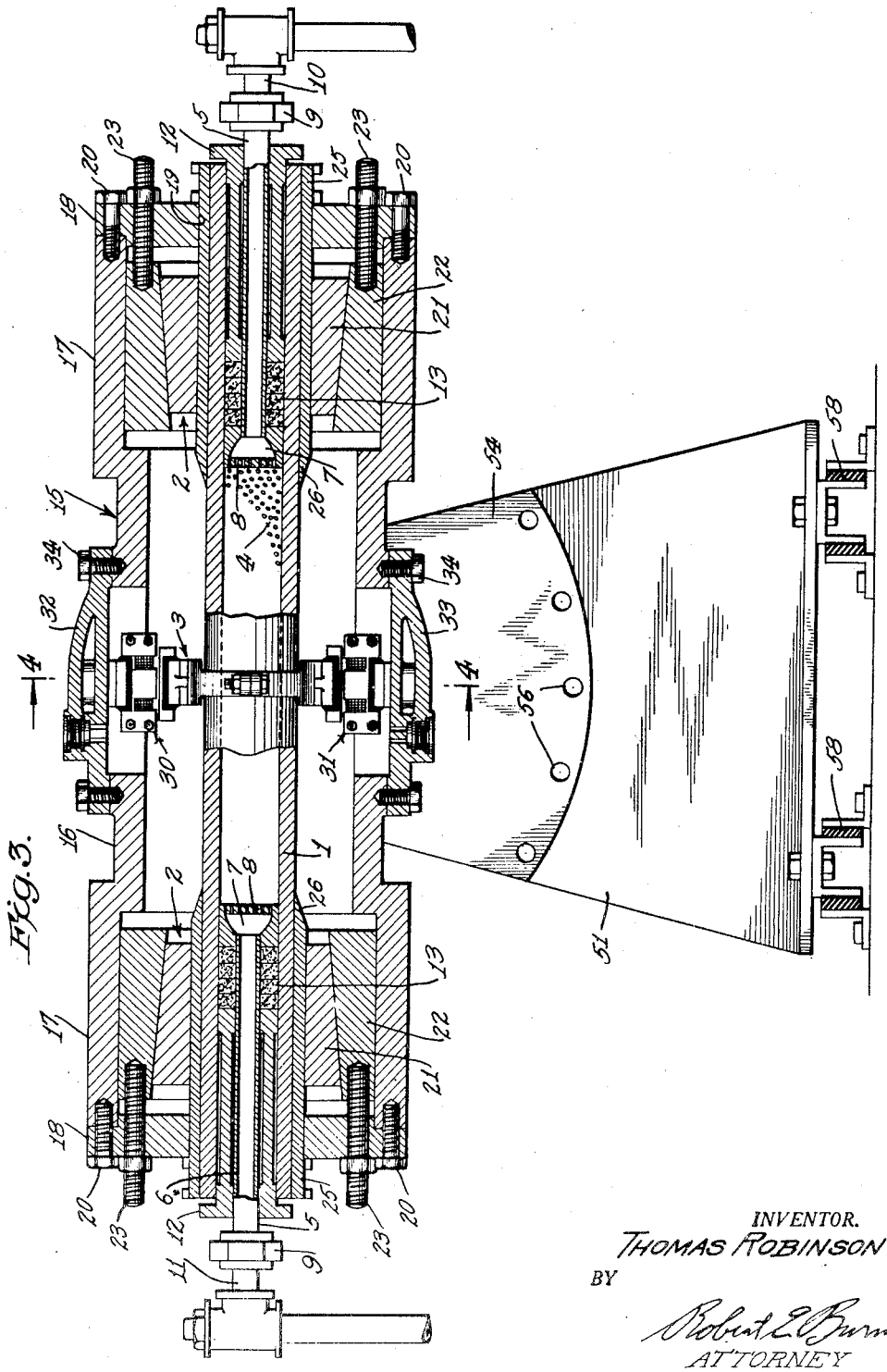

April 26, 1949.    T. ROBINSON    2,468,515
APPARATUS FOR SONIC PULVERIZATION
AND DISPERSION OF MATERIALS
Filed Nov. 29, 1944    5 Sheets-Sheet 3

INVENTOR.
THOMAS ROBINSON
BY
Robert E. Burns
ATTORNEY

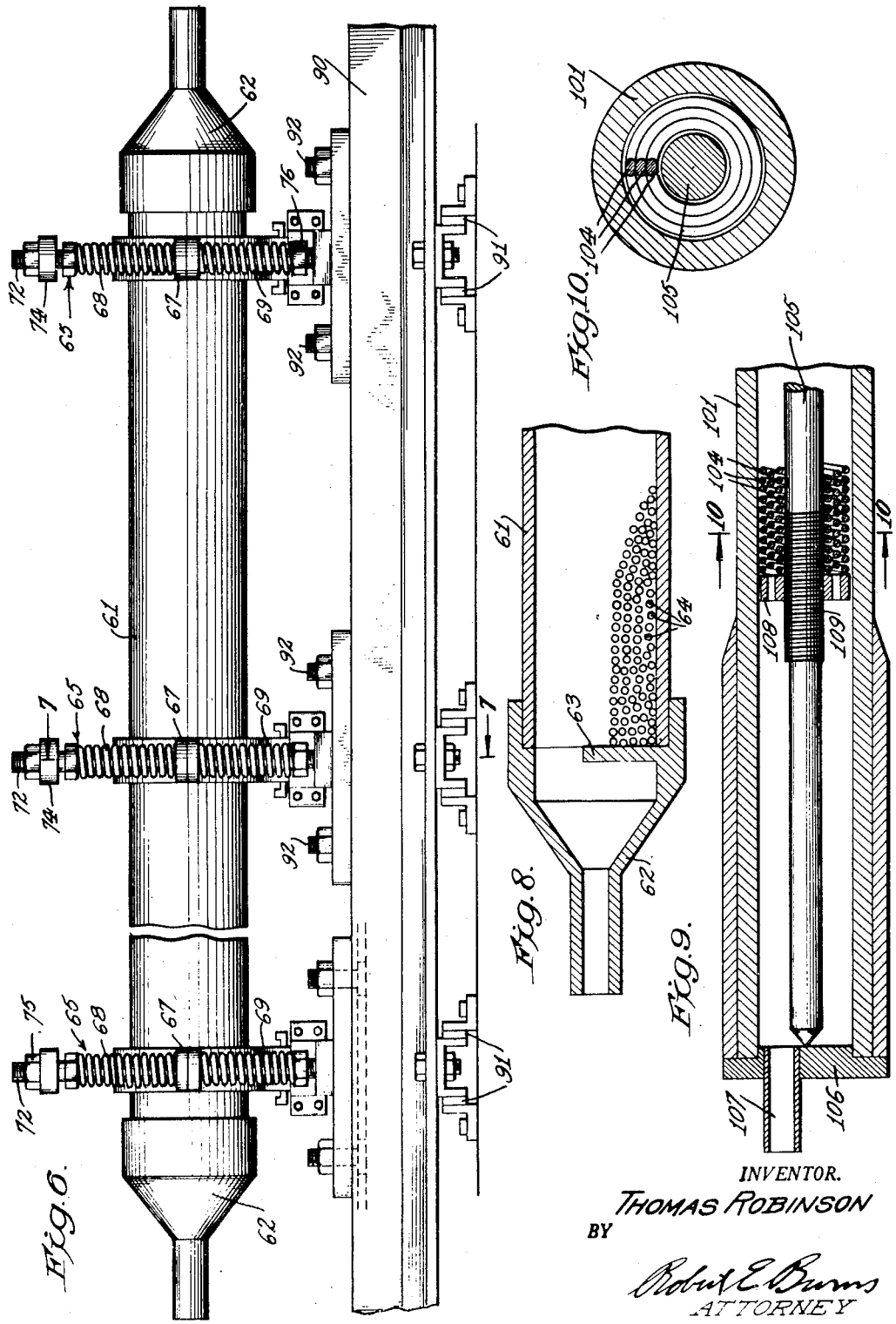

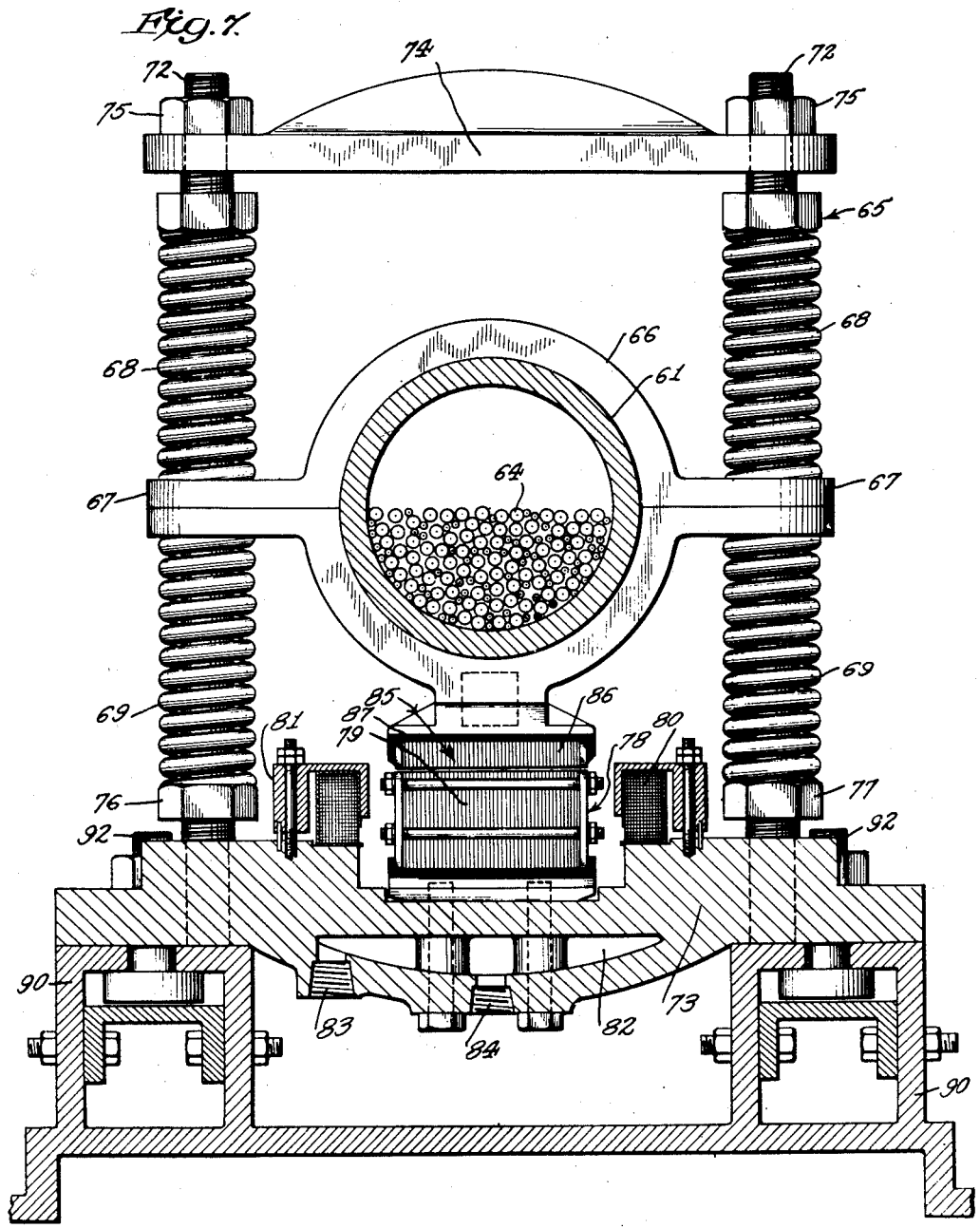

Patented Apr. 26, 1949

2,468,515

UNITED STATES PATENT OFFICE 2,468,515

APPARATUS FOR SONIC PULVERIZATION AND DISPERSION OF MATERIALS

Thomas Robinson, New York, N. Y., assignor to Lancaster Processes, Inc., New York, N. Y., a corporation of New York Application November 29, 1944, Serial No. 565,728

10 Claims. (Cl. 241—170)

The present invention relates to the sonic pulverization and dispersion of materials, as for example, in the preparation of emulsions and suspensions, hereinafter referred to generically as dispersions. The term "dispersions" as here used is understood to include any material or mixture in which particles of solid or liquid material are suspended permanently or temporarily in a fluid medium. In speaking of the preparation of such dispersions, the term "preparation" is used as including both the initial production and subsequent treatment for reducing the particle size or altering the properties of the dispersion.

In preparing dispersions it is highly desirable to reduce the particle size to extremely low values, for example, to a fraction of a micron. The minute size of the particles not only contributes to the stability of the dispersion, but also affects in many instances the physical, chemical, pathological and other properties of the substance. Moreover, it is frequently desirable to pulverize solid materials to extremely small particle size, and this may advantageously be done by suspending the comminuted solid material in a fluid material and subjecting the fluid suspension to treatment to reduce the size of the solid particles. It will be understood that the term "particle" is used in a generic sense to refer to particles of solid in a suspension, and also to globules or particles of liquid in an emulsion.

As the particle size becomes smaller, it is more and more difficult to obtain further reduction. It is still more difficult to achieve the minute particle size desired in a practical, commercial process, as distinguished from laboratory methods. In a commercial process it is necessary to consider not only the ultimate size of the particles produced, but also such factors as rate of production, uniformity of product, economy of operation, original cost and required maintenance of the apparatus and general practicability. The commercial preparation of dispersions of extremely small particle size thus presents a difficult problem.

It has heretofore been proposed to subject material in a liquid state to vibration in the sonic or super-sonic range, depending on the effect of compression waves generated in the material and on cavitation produced by such waves to reduce the size of the particles. This action has been found slow and ineffective, particularly when it is desired to reduce the size of solid particles suspended in a fluid. Moreover, the compression waves and any cavitation produced thereby have been found to vary with the inherent nature of the material and the conditions under which it is treated, and these factors are not always subject to satisfactory control. While some reduction in particle size may be possible under laboratory conditions, the method has not proved satisfactory on a commercial scale.

It is an object of the present invention to provide an apparatus for treating material, for example in the preparation of dispersions whereby the particle size can be reduced to exceedingly low values, for example, a fraction of a micron. A further object of the invention is to provide an apparatus for treating materials wherein particle sizes of the order of a micron or less can be produced rapidly and economically on a commercial scale as distinguished from theoretical or laboratory methods.

In accordance with my invention the material to be treated is subjected to the action of a multiplicity of discrete elastic bodies, for example, elastic spheres activated by a source of high frequency vibration. In a preferred form of my invention, the activated elastic spheres or other bodies are suspended in free vibratory motions, their movement being comparable to the movement of the molecules of a gas. The action of the activated elastic bodies on the material being treated is complex in its nature. In addition to the effect produced by the vibration of the material itself and the vibration of the walls of the chamber or container in which the material is being treated, the material is subjected to the action of the elastic bodies moving at high velocity along ever changing paths of travel through the material and to the effect of rapidly recurring collisions of the elastic bodies with one another and with the walls of the container. The interaction and combined effect of these simultaneously occurring factors results in rapid and effective reduction of particle size in the preparation of a dispersion or other treatment of material. Moreover, the treatment has been found to produce other desirable results, such for example killing the bacteria in a material whereby the bacterial count is substantially reduced. Thus, for example, the treatment of milk by my novel process will produce homozenization of the milk and simultaneously effect a reduction in the bacterial count comparable to that obtained by pasteurization so that separate pasteurization of the milk is unnecesary. The single treatment in accordance with the present invention thus replaces the heretofore separate processes of homogenization and pasteurization of milk or other material.

Another feature of my invention is that the frequency and amplitude of vibration of the vibrating elastic bodies is subject to selection and control whereby such bodies can be caused to vibrate at a frequency and with an amplitude different from the frequency and amplitude of the energy source by which said bodies are activated. Thus, although the amplitude of movement of the source may be limited by its structure and by the power available, the elastic bodies may be caused to vibrate at a substantially greater amplitude with correspondingly greater effectiveness in treatment of the material. Likewise the elastic bodies can be caused to vibrate at a higher or lower frequency than that of the energy source. It will be understood that by controlling the frequency and amplitude of vibration of the activated elastic bodies, the velocity at which said bodies are caused to move through the material can likewise be controlled. By suitably selecting the number and size of the vibrating elastic bodies and by controlling the amplitude, frequency and velocity of their vibratory movements, the process, in accordance with the present invention, can be varied to suit the particular material being treated, or the particular result it is desired to obtain. The process thus affords great flexibility in treating different materials under different conditions to obtain different results.

A further feature of the apparatus in accordance with my invention is that it can be operated either continuously or by the batch method. In commercial production the continuous process has the advantages that it provides a higher rate of production and greater simplicity of operation, and achieves greater uniformity in the product. In processing fluent material by the continuous method, in accordance with my invention, the material is passed through a tube or passageway containing a multiplicity of elastic bodies in vibratory motion. By correlating the velocity of flow of the material through the passageway and the activation of the elastic bodies so that the velocity is reduced at a zone of maximum activation, still greater effectiveness of treatment can be obtained.

The apparatus in accordance with my invention consists essentially in a treating chamber, a multiplicity of elastic impact elements in the chamber, and means for applying vibrational energy to the chamber and the impact elements whereby the material being treated is simultaneously subjected to vibration and to the action of the vibrating and rapidly moving impact elements. By selecting and controlling the frequency of vibration of the impact elements, the latter may be caused to vibrate at a frequency different from that of the treating chamber or enclosure. In a preferred embodiment of my invention the treating chamber is in the form of a tube or passageway through which the material may be passed either continuously or intermittently during treatment.

The apparatus in accordance with my invention is constructed as a simple and compact unit suited for commercial production and operation. A feature of the apparatus is that its useful life is increased by avoiding dangerous stress concentrations and by eliminating other factors tending to cause failure of component parts. Moreover, the parts of the apparatus that are subject to stress or wear in the operation of the unit, as for example, the vibratory elements, are relatively inexpensive and can be easily and cheaply replaced.

A further feature of my apparatus is that it provides greater capacity for commercial treatment of materials and more efficient and effective utilization of energy available for the treating process. Moreover the operating characteristics of the apparatus are readily variable or adjustable to secure most effective and efficient operation, and to permit the apparatus to be quickly adapted to treat different kinds of material or to produce different results.

Other objects and advantages of my invention will be understood from the following description and appended claims, in conjunction with the accompanying drawings, which illustrate by way of example apparatus for carrying out my invention.

In the drawings,

Fig. 1 is a side elevation of one form of apparatus in accordance with my invention.

Fig. 2 is an end elevation of the apparatus shown in Fig. 1.

Fig. 3 is a central vertical sectional view taken approximately on the line 3—3 of Fig. 2.

Fig. 6 is a side elevation of another embodiment of apparatus in accordance with my invention.

Fig. 7 is an enlarged cross section taken approximately on the line 7—7 in Fig. 6.

Fig. 8 is an enlarged fragmentary detail of one end of the tube shown in Fig. 6.

Fig. 9 is a longitudinal sectional view through the treating tube showing a further modification.

Fig. 10 is a cross section taken approximately on the line 10—10 in Fig. 9.

Figure 5:
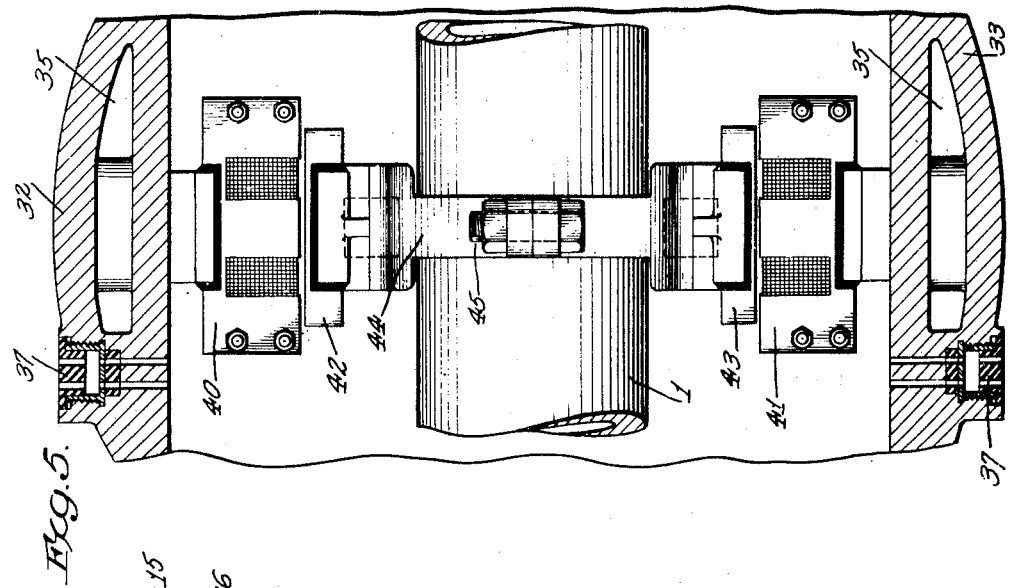
Fig. 5 is an enlarged fragmentary sectional view taken approximately on the line 5—5 in Fig. 4.
Figure 4:
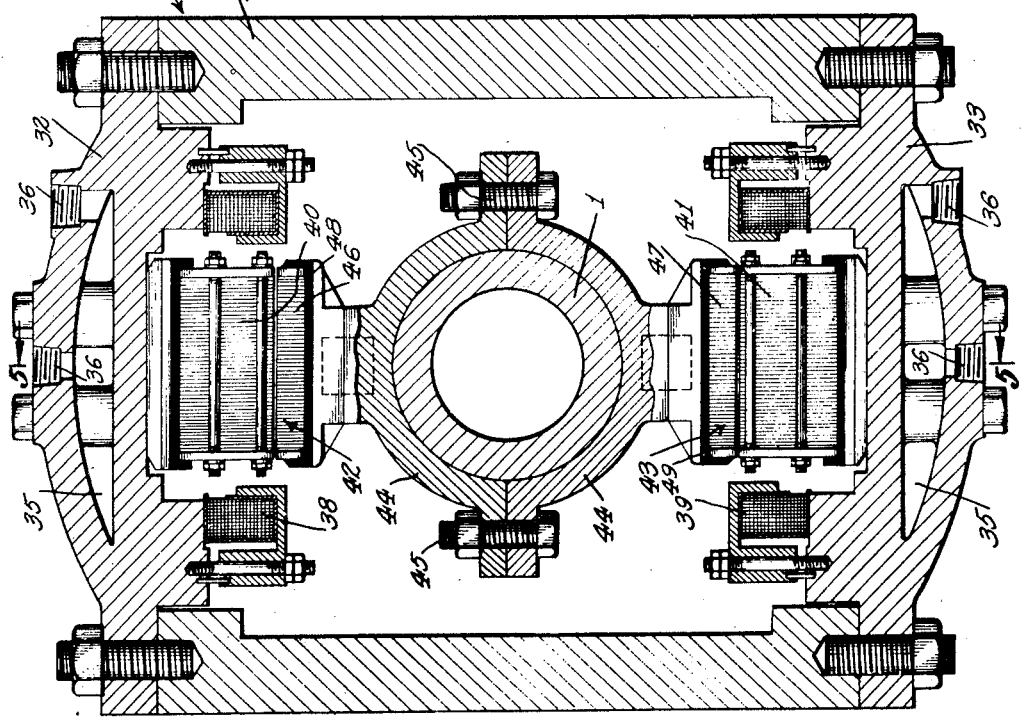
Fig. 4 is an enlarged vertical cross section of the apparatus taken approximately on the line 4—4 of Fig. 3.

In Figs. 1 to 5 of the drawings there is shown by way of example one embodiment of apparatus for carrying out my invention. In this embodiment of my invention the treating space or chamber for the material to be treated is in the form of a tube 1. This tube is formed of elastic or resilient material, for example, stainless steel, and is shown as being supported at each end by a bearing 2, the central portion of the tube being free to vibrate. The dimensions and characteristics of the tube 1 are selected so that the tube will vibrate at the frequency desired. The bearings 2 are preferably adjustable toward and away from one another to vary the length of the tube between the bearings, and thereby vary its natural frequency of vibration. The tube is vibrated by applying vibratory energy to its central portion, for example, by electro-magnetic vibrating means, indicated generically by the reference numeral 3. In the embodiment illustrated in the drawings, the tube is vibrated transversely of its length, the central portion of the tube moving up and down in a substantially vertical direction. The amplitude of vibration is determined by the dimensions and characteristics of the tube, the vibratory energy applied to the tube and the damping action of the material being treated, and other forces acting on the tube. The amplitude and frequency of vibration of the tube can thus be determined by proper selection of the controlling factors.

In the treating chamber or tube 1 there are provided a multiplicity of elastic bodies or impact elements 4 adapted to be energized or activated by vibration of the tube. These impact elements are formed of hard elastic or resilient material, such as stainless steel, and are shown as being spherical in shape, similar to the steel balls used in ball bearings. The balls 4 substantially fill the central portion of the tube, sufficient space being left, however, to permit movement of the balls. When vibrational energy is applied to the tube 1, the balls or impact elements in the tube are activated so as to be suspended in free vibratory motion throughout the entire cross sectional area of the inside of the tube. The material in all parts of the treating chamber is thus subjected to the action of the rapidly vibrating balls.

The treating chamber is provided with a suitable inlet opening and outlet opening to admit material to the chamber and discharge it after treatment. Preferably there are two or more openings so arranged that the material can be passed continuously or intermittently through the chamber during treatment. In the embodiment shown in the drawings, a pair of spacer elements 5 arranged at opposite ends of the tube 1, serve the dual function of providing inlet and outlet openings for the material being treated and retaining the balls or impact elements 4 in the central portion of the tube forming the treating chamber. Each of the spacer elements 5 has a tubular shank portion 6 and a head portion 7 having a perforated or slotted face 8 which permits the passage of fluid material but prevents escape of the impact elements 4. The outer end of each spacer element 5 is connected for example by a union 9 with a pipe or conduit 10, 11, one of the pipes, for example pipe 10, forming the inlet and the other pipe 11 forming the outlet of the apparatus. Suitable feed means, for example a pump, or gravity feed system, is provided for passing the material through the treating chamber, and suitable control means, such for example as hand operated or automatic valves, pressure guages, flowmeters, etc., are preferably provided for controlling the pressure and rate of flow of the material. As these may all be conventional units they are not shown in the drawings. Each of the spacer elements 5 is positioned in the tube 1 by a gland nut or bushing 12 and one or more packing rings 13 formed for example of soft rubber or synthetic rubber composition, such as neoprene, encircle the shank portions 6 of the spacer elements to form a fluid tight seal. With the arrangement shown, the spacer elements 5 are readily removable to permit insertion or removal of the balls 4 and to facilitate cleaning of the apparatus. They are also adjustable lengthwise of the tube to decrease or increase the space between them which forms the treating chamber.

In carrying out my invention with the apparatus shown in Figs. 1 to 5 of the drawings, the material to be treated is introduced into the treating chamber formed by the vibrating tube 1. The vibrational energy of the tube is transmitted to the impact elements or balls 4, causing the balls to be activated and suspended in the tube in free vibratory motion. The material being treated is thus submitted not only to the vibration of the tube and to the compressional waves thereby generated in the material, but also to the action of the vibrating impact elements. The action of the impact elements on the material in quite complex as the balls are free to move in any direction and are continually colliding with one another and with the walls of the chamber. As the balls are formed of elastic material, for example steel, they rebound upon impact and transmit energy from one element to another in much the same manner as billiard balls. It will be appreciated that some of the impacts will be head on, while others will be glancing, and that a ball may strike a plurality of other balls simultaneously or in rapid succession. Moreover, the velocity of the balls and their free paths of travel will vary widely and be constantly changing. The material undergoing treatment is thus subjected to the action of the balls moving rapidly through it and the rapidly recurring impacts between the balls and between the balls and the walls of the treating chamber. Moreover the vibration and vibratory movement of the impact elements set up complex compressional waves in the material being treated, which are superposed on and are interactive with compressional waves generated by vibration of the tube walls. As the action of the impact elements extends throughout the cross sectional area of the tube, all portions of the material are subjected to treatment. Moreover, the vibratory motion of the impact elements and the impact of these elements with one another effects a thorough intermixing of the material, so that uniformity of the product is still further assured.

Preferably the fluent material being treated is passed continuously through the treating chamber, being introduced at one end of the tube 1 and discharged from the other end. The rate of flow is accurately controlled and coordinated with the actuation of the tube and the balls to effect the desired treatment during passage of the material through the treating chamber. It will be noted that the spacers 5 retain the balls in the central portion of the tube, where its vibration and hence the activation of the balls is greatest. Moreover, the cross sectional area of the fluid passageway for the material is greatest at this point, since the inside diameter of the tube 1 is substantially greater than that of the tubular portions 6 of the spacer elements 5 and the connecting pipes 10 and 11. Hence the fluid material being passed through the apparatus will flow more slowly in passing through the central portion of the tube 1. The increased hold over time of the material in the central portion of the tube where the activation of the balls is at a maximum, results in more thorough and intensive treatment, while at the same time the rate of flow of the material in the connecting passageways, e. g., the spacers 5 and pipes 10, 11, is sufficiently high to avoid any separation or settling of temporarily suspended particles.

One of the factors affecting the effectiveness of treatment of the material is the amplitude of the vibration. The amplitude of the vibrating tube is limited by the characteristics and loading of the tube, and the amount of power it is possible to apply effectively to it. However, I have found that by properly selecting the size and characteristics of the impact elements or balls 4 and the closeness with which they are packed into the tube, the amplitude of vibration of the impact elements can be controlled independently of the amplitude of vibration of the tube. Thus, for example, the balls may be caused to vibrate with substantially greater amplitude than the tube, thereby acting with greater effectiveness on the material being treated.

A further feature of my invention is that the amplitude of vibration of the balls is subject to selection and control to provide, for example, for the treatment of different materials or for treatment under different conditions, or to effect different results. By varying the size or number of the balls in the treating chamber, or by adjusting one or both of the spacer elements 5 to vary the distance between them, the free path of travel of the balls, and hence the amplitude of their vibratory movement may be varied as desired. Thus the balls may be caused to vibrate at a substantially greater amplitude than the tube 1.

The frequency of vibration of the balls may likewise be selected and controlled. Although the balls are activated by vibration of the tube 1, they tend to vibrate at their natural frequency, subject to any superimposed forced vibrations. Hence, by selecting the size and characteristic of the balls and controlling their freedom of movement, for example by adjustment of the spacer elements 5 to vary the mean free path of movement of the balls, the natural frequency of vibration of the balls may be controlled. The balls 4 may thus be made to vibrate at a higher or lower frequency than the tube. They may for example vibrate at a harmonic of the frequency at which the tube 1 vibrates. In addition to their vibratory movement in the space within the treating chamber the balls, because of rapidly striking the walls of the tube and other balls, vibrate by distortion of the normal shape of the balls. This distortional vibration will ordinarily be of much higher frequency than the principal vibratory movement of the balls. As the frequency of the balls can quickly and easily be changed by changing the balls or varying the distance between the spacer elements 5, a convenient means is afforded for varying the operating characteristics of the apparatus to suit different materials or different conditions of treatment.

The details of construction of the apparatus for carrying out my invention can be varied to meet different operational requirements. In the embodiment illustrated in Figs. 1 to 5 the vibrating tube 1 forming the treating chamber of the apparatus is supported by a frame 15, which is shown in the form of a casing or housing enclosing the tube. The central portion 16 of the casing 15 is illustrated as being of square or rectangular cross section, while the end portions 17 are cylindrical. An end plate or head 18 having an opening 19 to receive the tube 1 is secured to each end of the housing 15, for example, by a plurality of bolts 20.

The bearings 2 for supporting the tube 1 at its ends are carried by the housing 15, being interposed between the ends of the tube and the circular portions 17 of the housing. In the form shown in the drawings, each of the bearings 2 comprises an inner sleeve 21 having a substantially cylindrical inner face and an inclined or frustro-conical outer face and an outer sleeve 22 having an inclined or tapered inner face adapted to engage the outer face of the inner sleeve. Each of the sleeves 21, 22 is expansible and contractible, for example, by being slotted or split so that relative axial movement of the sleeve will cause the inner sleeve 21 to contract and grip the tube 1, while the outer sleeve 22 is expanded to fit tightly in the cylindrical portion 17 of the housing 15. The bearings are thus wedged tightly between the housing 15 and the tube 1, providing a firm and rigid support for the ends of the tube. A plurality of bolts 23 are provided for moving the outer sleeve axially while the inner sleeve 21 is adjustable in an axial direction by a plurality of bolts 24 (Fig. 2). By axial adjustment of the inner bearing sleeves 21, the effective lengths of the tube between the bearings and hence the frequency of vibration of the tube can be readily adjusted. The combined thickness of the inner sleeve 21 and outer sleeve 22 is preferably slightly greater at the inner end of the bearings than at the outer end to insure that the tube is gripped tightly at each end of the unsupported span between the bearings.

The tube 1 is of enlarged diameter at the point where it is held by the bearings, the diameter being gradually reduced, so that stress in the tube adjacent the bearings is distributed and dangerous concentration of stress is avoided. In the form shown in the drawings, each end of the tube is surrounded by a sleeve 25 which fits tightly on the tube, for example, by being shrunk onto the end of the tube. The sleeve 25 is of somewhat greater length than the bearings and the inner end of the sleeve is tapered, as indicated at 26, to provide a gradual reduction of outside diameter. By thus eliminating concentration of stress, the life of the tube is greatly increased. The tube is preferably peened inside and out, for example by shot blasting to increase its life still further. It will be noted that the impact of the balls 4 on the inner surface of the tube automatically peens the inside of the tube upon operation of the apparatus.

In the form of my invention illustrated in Figs. 1 to 5 the means for vibrating the tube is shown as comprising opposed electro magnets 30 and 31 arranged to act alternately on the tube 1. Each of the electro magnets 30, 31 is mounted on a plate or base 32, 33, which forms a removable closure for an opening in the central rectangular portion of the housing 15, being secured to the housing by a plurality of bolts 34. Each of the base plates 32, 33 is shown hollow or cored, as indicated at 35, to provide for the circulation of a cooling medium, suitable openings 36 being provided for connection to inlet and outlet passages. A fitting 37 is also provided in each of the base plates for making electrical connections to the electro magnet. Each of the electro magnets 30, 31 comprises a coil 38, 39 and a laminated core 40, 41. The electro magnets 30, 31 act respectively on armatures 42, 43, provided on the tube 1. In the embodiment shown in Figs. 1 to 5, the two armatures are carried by a saddle or yoke 44 which is formed in two parts adapted to be drawn together by bolts 45, to grip the tube tightly. Each of the armatures 42, 43 preferably comprises a multiplicity of laminae 46, 47, held by a bracket 48, 49 on the yoke 44. The axial extent of the yoke 44 is preferably relatively small, so that the yoke does not bind or constrict the tube 1 to interfere with its flexibility and vibration. If desired, the inner surface of the yoke may be rounded slightly, at least at its corners to avoid any binding of the tube or undesirable stress concentration. It will be noted that the upper and lower electro magnetic units and associated parts are identical and interchangeable, thereby simplifying manufacture and maintenance.

Alternating or pulsating current is supplied to the electro magnets 30, 31 by suitable electric conductors (not shown) extending through fitting 37. Upon being thus energized, the electro magnets apply vibrational energy to the tube and to the impact elements contained therein. It will be understood that the current supplied to the upper magnet 30 should be approximately 180° out of phase with that of the lower magnet 31 so that upward and downward impulses are applied alternately to the tube. To obtain greater amplitude of vibration, the frequency of the impulses should correspond approximately to the natural frequency of vibration of the tube. The tuning of the apparatus may be accomplished by varying the frequency of the current supplied to the magnet or by changing the natural frequency of the tube, for example by axial adjustment of the bearings 2 by which the tube is supported. While the use of two magnets as shown in the drawings makes it possible to apply more power to the tube, it will be understood that either a push-pull magnet one operating on alternating current and having a polarized armature, or a single magnet acting on the tube in one direction only, may be used, as the inherent resilience and inertia of the tube 1 supplies the restorative force for moving the tube in the opposite direction. Moreover, the magnet or magnets for vibrating the tube may act on the tube elsewhere than at the central point as shown, depending on the mode of vibration of the tube. In general when the tube is held by fixed supports the vibrational energy should be applied at an anti-node or anti-nodes of vibration while the tube is supported at a node or nodes.

It will be noted that the central portion of the tube i. e., the portion having greatest amplitude of vibration, is completely enclosed by the housing 15 including the closure plates 32, 33 and is thereby acoustically insulated. Moreover the space between the central portion of the tube and the housing may be sealed and at least partially evacuated, for example by a suitable vacuum pump, to decrease still further the transmission of noise to the atmosphere, and to retain the vibrational energy in the tube where it is put to useful work. Alternatively the space may be used to accommodate temperature controlling means or for the circulation of a temperature controlling medium, to control for example the temperature of the material under treatment.

With the construction described above, each of the electro magnet units is readily removable by removing the base plates 32, 33. Removal of the base plates also permits access to the armatures 42, 43 and the yoke 44. By removing or loosening the yoke 44 and the bearings 2, the tube 1 may be slipped lengthwise of the housing for cleaning, inspection or replacement.

The housing 15 is mounted on a suitable base or support 51. In the embodiment of Figs. 1 to 5 the housing is provided with laterally projecting axles or trunnions 52 held in suitable bearings 53 of the base 51 to provide a pivotal mounting of the housing (Figs. 1 and 2). Tilting of the housing about its transverse axis may be controlled by an arm 54 (Fig. 2) having an aperture 55 adapted to be aligned with one or another of a series of apertures 56 provided in the base 51 (Fig. 3). A removable or retractable pin 57 inserted in the aligned holes serves to hold the housing in whatever position is desired. The pivotal mounting of the housing 15 permits the whole housing and hence the treating tube 1 to be tilted for the purpose of emptying or cleaning the tube, or removing or inserting the balls 4. The base 51 is mounted on a suitable foundation for example by shear type rubber mountings 58 to lessen transmission of vibration to the foundation.

Another form of apparatus for carrying out my invention is shown in Figs. 6 to 8. In this embodiment the treating chamber is formed by a tube 61 adapted to receive the material to be treated and containing means for subjecting the material to rapidly recurring impact upon vibration of the tube, and actuation of the impact means. The impact means is shown in the form of a multiplicity of elastic spheres or balls 64. The balls are formed of hard elastic material, for example stainless steel, and are shown as being of a plurality of different sizes. As in the embodiment of Figs. 1 to 5 the number of balls in the tube may be varied as desired, the tube being shown about half full of balls. The ends of the tube are provided with connectors 62 for inlet and outlet conduits, for example, flexible hose. The material being treated may thus be introduced into one end of the tube, passed through the tube during treatment, and be discharged from the opposite end of the tube. A dam 63 is provided in each of the connectors 62 to retain the balls 64 while permitting flow of the material being treated over the dam. The more finely pulverized material will in general rise to the top and flow over the dam at the discharge end of the tube, while coarser material is retained for continued treatment. In pulverizing dry material, a current or blast of air, or other fluid, may be passed through the tube to carry off the material as it is reduced to the desired particle size.

The tube 61 may be of any desired length and is supported at spaced points in such manner that the tube can be vibrated as a unit throughout its length. In the drawings, the tube is shown resiliently supported by a plurality of supporting and vibrating units 65 (Fig. 6). Each of these units comprises a yoke 66 (Fig. 7) which grips the tube 61 and has laterally projecting ears 67 held between compression springs 68 and 69. Guide rods or shafts 71 and 72 extend up on each side of the tube from a base 73, and pass through the springs 68, 69 and through holes in the ears 67 to guide both the yoke 66 and the springs. The tops of the shafts 71, 72 are threaded and are connected by a transverse member 74 held on by nuts 75. The lower ends of the shafts 71, 72 are also threaded and nuts 76, 77 are provided for adjusting the neutral position of the yoke 66 and the tension of the springs 68, 69.

The base member 73 also carries electromagnetic means for applying vibrational energy for vibrating the tube 61 and activate the impact means therein. The vibrating means is shown as an electromagnet 78 comprising a laminated core 79, and a coil or winding 80 surrounding the core and held on the base by bracket 81. The base may be hollow, as indicated at 82 to receive water or other temperature controlling medium, and suitable openings 83 and 84 are provided for circulation of the cooling medium through the hollow base.

The electromagnet 78 acts on an armature 85 provided on the tube. In the drawings the armature is shown as a plurality of laminae 86 held by a bracket 87 secured to or integral with the yoke 66. The yoke thus serves the dual purpose of supporting the tube and providing means for vibrating it.

The base portion 73 of each of the supporting and vibrating units 65 is mounted on longitudinally extending bed-rails 90 supported on a suitable foundation preferably by vibration damping supports, as for example, the shear type rubber mountings indicated at 91 (Fig. 6). The bed-rails 90 are slotted to receive bolts 92 for bolting the base 73 securely to the rails. Any desired number of the resilient supporting and vibrating units 65 may be provided along the tube depending on the length of the tube and the desired spacing of the units. With the arrangement shown in the drawings, the units 65 are movable along the bed-rails 90 so that they may be positioned as desired.

The electromagnet 78 of the vibrating units 65 is energized by alternating or pulsating current to apply vibrational impulses to the resiliently supported tube or treating chamber 61, and thereby set the tube in vibration. The magnet may be of the push-pull type if desired, although this is unnecessary as the springs 68, 69 supply restorative forces to the tube. If desired magnets may be positioned at opposite sides of the tube as in the embodiment illustrated in Figs. 1 to 5. The frequency of the current supsupplied to the electromagnets is preferably approximately equal to the natural frequency of the resiliently supported tube. Tuning of the apparatus may be effected by varying the frequency of the electric current or by varying the frequency of the tube, for example, by adjustment of the nuts 76, 77 controlling the tension of the springs 68, 69. The vibrational energy applied to the tube activates the impact elements 64 in the tube, thereby subjecting the material being treated to the action of the rapidly moving balls and to rapidly recurring impacts between the balls and between the balls and the walls of the tube. As the tube 61 is vibrated throughout its length the material is subjected to treatment continuously throughout its passage through the tube. If desired, the tube may be rotatable or oscillatable in the yokes 66 and means may be provided for rotating or oscillating the tube during vibration. In this event the dam 63 may be replaced by a suitable grille or screen to retain the balls 64 while permitting passage of the material being treated.

In Figs. 9 and 10 there is shown a further embodiment of my invention in which the impact elements in the tube 101 which forms the treating chamber, are in the form of one or more helical springs 104. In the drawings three such springs are shown one inside the other. Each convolution of the spring or core 104 forms in effect an impact element. It will be seen that upon vibration of the tube 101 and springs 104 the material being treated is subjected to the motion and the impact of the individual convolutions of the springs. The springs 104 are positioned in the tube by a rod 105 extending through the springs and adapted to engage end closure members 106. The closures 106 are provided with inlet and outlet openings and connections 107 for introducing and discharging the material being treated. These openings are preferably off center as shown so as not to interfere with the spacing rod 105. A threaded perforated disc 108 engaging threads 109 on the rod 105 may be provided at one or both ends of the springs 104 so that the tension or compression of the springs and hence the spacing of the individual convolutions may be adjusted as desired. It will be understood that the rod 105 as well as the springs 104 forms an impact element for treating the material. With the arrangement shown in Figs. 9 and 10 where the impact means comprises a core inside the vibrating tube, an annular passage is provided between the tube and the core for passage of the material being treated. The frequency of vibration of the core is preferably different from that of the tube so that the tube and core vibrate out of phase with one another. Moreover in the embodiment shown, the frequencies of the individual springs 104 and the rod 105 are different from one another. It will be understood that the convoluted core forming the impact means in the treating chamber or tube, may if desired be in the form of a series of separate rings or convolutions instead of continuous helical springs.

The various features of the different embodiments and modifications of my invention herein described are interchangeable and combinable with one another. Thus, for example, the convoluted core of Figs. 9 and 10 may be used either in the form of apparatus shown in Figs. 1 to 5, or that shown in Figs. 6 to 8, as well as in other vibratory tubes. Likewise, different sizes of balls or impact elements may be used for treating different types of material, the different sizes being either mixed, as illustrated in Fig. 7, or segregated in different portions of the tube. For example, the material in passing through the tube may be subjected first to the action of larger balls and then to the action of successively smaller balls. While the apparatus has, for the sake of simplicity, been shown with a single tube forming the treating chamber, it will be understood that a plurality of tubes may be connected either in series or in parallel and that the tubes may be vibrated individually or may be coupled together, for example by a suitable yoke or yokes, so as to vibrate together. Still other applications and modifications of my invention will be apparent to those skilled in the art.

A further feature of my invention is that, owing to the symmetry of the vibrating tube, its moment of inertia and natural frequency of vibration is the same in all directions perpendicular. The tube may thus be vibrated in any direction, or may be vibrated simultaneously in more than one direction. For example, in the embodiment shown in Figs. 1 to 5, the tube may have a component of vibratory movement at right angles to its principal movement in a vertical direction so that the resultant motion of the tube is in the form of an elongated ellipse instead of being rectilinear as described above. Since the natural frequency of vibration of the tube is the same in a horizontal direction as in a vertical direction, a horizontal component of vibratory motion may be induced by the vertical vibration. If a greater amount of horizontal movement is desired, another magnet, or magnets, may be positioned to act on the tube in a horizontal direction. To produce elliptical motion of the tube, a magnet acting horizontally on the tube should be operated 90° out of phase with the magnet, or magnets, producing vertical vibration.

The frequency of vibration of the tube may be selected or varied in accordance with the type of material being treated, the nature of the treatment desired, and other design factors. However, with the apparatus shown, the vibration is harmonic vibration within the sonic range, as distinguished from a mere shaking action. With the apparatus of Figs. 1 to 5, the frequency of vibration of the tube may, for example, be of the order of 360 cycles per second. When the tube is vibrated throughout its length, as illustrated in Figs. 6 to 8, the frequency may be somewhat lower, for example, of the order of 3600 cycles per minute. In addition to its principal vibration, the tube may have secondary vibration resulting from vibration of the unsupported portions of the tube between the supporting units 65, in a manner similar to the vibration of the central portion of the tube of the embodiment shown in Figs. 1 to 5.

What I claim and desire to secure by Letters Patent is:

1. Apparatus for treating fluent material, which comprises a flexible and resilient tube supported at its ends and adapted to receive said material, means for applying vibrational energy to the central portion of said tube to set said tube in vibration by flexing of the tube transversely of its length, and an impact element in said tube and adapted to vibrate out of phase with said tube.

2. Apparatus for treating material, comprising a flexible, resilient tube adapted to receive said material and mounted for vibratory motion, means for applying vibrational energy to set said tube in vibration by flexing the tube transversely of its length, the amplitude of vibration varying along the length of said tube, a multiplicity of impact elements in said tube and spacers for retaining said impact elements in a zone of vibration of greater amplitude.

3. Apparatus for treating material, comprising a tube adapted to receive said material and mounted for vibratory motion, a multiplicity of elastic impact elements in said tube, means for vibrationally flexing said tube transversely at its length and applying vibrational energy to said impact elements to set said elements in vibratory motion, spacers for retaining said impact elements in a selected zone in said tube, the distance between said spacers being variable to vary the mean free path of travel of said impact elements.

4. Apparatus for treating material comprising a hollow cylindrical vibratile tube adapted to receive said material, means for supporting said tube for vibratory motion by flexing of said tube transversely of its longitudinal axis, means for vibrating said tube, and a tapered sleeve surrounding said tube adjacent said support to distribute the stresses arising from the flexing of said tube.

5. Apparatus for treating material, comprising a tube adapted to receive said material, a casing for said tube, bearing members between said casing and said tube, said bearing members being adjustable axially of said tube to vary the effective length of the tube between bearings, and means for vibrating said tube, transversely of its length between said bearings.

6. Apparatus for treating material, comprising a frame, a hollow cylindrical tube supported at spaced points by said frame and adapted to receive the material to be treated, a multiplicity of elastic spheres in said tube, a yoke extending around said tube intermediate said points, an armature carried by said yoke, and an electromagnet supported by said frame and acting on said armature to vibrate said tube.

7. Apparatus for treating material comprising a tube adapted to receive said material and supported for vibratory motion, a convoluted resilient core disposed concentrically in said tube and movable relative thereto, the outer diameter of said core being slightly less than the inner diameter of said tube, and means for vibrating said tube and core, transversely of their length.

8. Apparatus for treating material, comprising a tube adapted to receive said material and supported for vibratory motion, a helical spring disposed concentrically in said tube and movable relative thereto, the outer diameter of said core being slightly less than the inner diameter of said tube, and means for vibrating said tube and spring, transversely of their length.

9. In apparatus for processing material, the combination of a hollow cylindrical vibratile tube adapted to receive said material, means for rigidly supporting a portion of said tube while leaving another portion free for vibratory movement in a direction transverse to the axis of said tube by flexing of the tube, impact means movably confined in said tube, an armature carried by said free portion of the tube, and an electromagnet acting on said armature to vibrate said tube.

10. In apparatus for processing material, the combination of a hollow cylndrical vibratile tube adapted to receive said material, means for rigidly supporting a portion of said tube while leaving another portion free for vibratory movement in a direction transverse to the axis of said tube by flexing of the tube, a multiplicity of elastic spheres loosely confined in said tube, an armature carried by said free portion of the tube, and an electromagnet acting on said armature to vibrate said tube.

THOMAS ROBINSON.

REFERENCES CITED

The following references are of record in the file of this patent:

UNITED STATES PATENTS

| Number | Name | Date |
|---|---|---|
| 1,154,981 | Fennell | Sept. 28, 1915 |
| 2,117,965 | Kiesskalt | May 17, 1938 |
| 2,168,090 | Butler | Aug. 1, 1939 |
| 2,170,178 | Williams | Aug. 22, 1939 |
| 2,249,364 | Osgood | July 15, 1941 |
| 2,284,548 | Wood | May 26, 1942 |
| 2,323,544 | Kiesskalt | July 6, 1943 |
| 2,323,864 | Weyandt | July 6, 1943 |
| 2,360,893 | Robinson | Oct. 24, 1944 |
| 2,363,937 | Brandt | Nov. 28, 1944 |

FOREIGN PATENTS

| Number | Country | Date |
|---|---|---|
| 233,164 | Germany | Apr. 1, 1911 |

OTHER REFERENCES

"Proceedings of International Conference on Bituminous Coal," 1926, pp. 343, 344, 345, published by Carnegie Institute of Technology, Pittsburgh, 1927. (Copy in Library of Department of Commerce.)

Jeffrey Traylor Catalog No. 650 of 1937, page 20. (Copy in Div. 25.)